United States Patent [19]

Camacho

[11] Patent Number: 5,204,508
[45] Date of Patent: Apr. 20, 1993

[54] METHOD AND APPARATUS FOR ENHANCING THE QUALITY OF CAST BILLETS

[75] Inventor: Salvador L. Camacho, Raleigh, N.C.

[73] Assignee: Plasma Energy Corporation, Raleigh, N.C.

[21] Appl. No.: 560,373

[22] Filed: Jul. 31, 1990

[51] Int. Cl.$^5$ ............................................. B23K 9/00
[52] U.S. Cl. ........................... 219/121.59; 219/121.38; 219/121.48; 219/121.37
[58] Field of Search ...................... 219/121.37, 121.38, 219/121.54, 121.52, 121.48, 121.59, 76.16; 148/154, 13, 13.2

[56] References Cited

U.S. PATENT DOCUMENTS

| | | |
|---|---|---|
| 2,125,175 | 7/1938 | Jones . |
| 2,157,313 | 5/1939 | Alles et al. . |
| 2,306,370 | 12/1942 | Anderson . |
| 2,487,974 | 11/1949 | Kirk . |
| 2,538,074 | 1/1951 | Anderson . |
| 3,337,202 | 8/1967 | Gruber . |
| 3,538,297 | 11/1970 | Maniero et al. . |
| 3,596,047 | 7/1971 | Maniero et al. . |
| 3,966,504 | 6/1976 | Sipek et al. ........................... 266/51 |
| 4,194,727 | 3/1980 | Layden et al. . |
| 4,318,439 | 3/1982 | Hiroshima et al. . |
| 4,393,296 | 7/1983 | Dompas . |
| 4,405,382 | 9/1983 | Baier et al. ........................... 266/51 |

FOREIGN PATENT DOCUMENTS

| | | |
|---|---|---|
| 1096170 | 12/1960 | Fed. Rep. of Germany ........ 266/52 |
| 55-106677 | 8/1980 | Japan . |
| 0209478 | 11/1984 | Japan ..................................... 266/52 |

Primary Examiner—Mark H. Paschall
Attorney, Agent, or Firm—Bell, Seltzer, Park & Gibson

[57] ABSTRACT

A method and apparatus is disclosed for removing chevron cracks from the corner edges of a steel billet as it advances in a hot condition from a continuous casting operation. The apparatus includes a framework which mounts four plasma arc torches which are adapted to operate in the non-transfer arc mode, and with the torches being positioned so that the heated plasma engages respective ones of the four corner edges of the billet, to melt and heal any cracks. The framework is cyclically advanced rearwardly and forwardly along the path of travel of the billet, so as to permit effective control of the level of heating and so as to assure all longitudinal portions of the advancing billet are effectively treated.

8 Claims, 1 Drawing Sheet

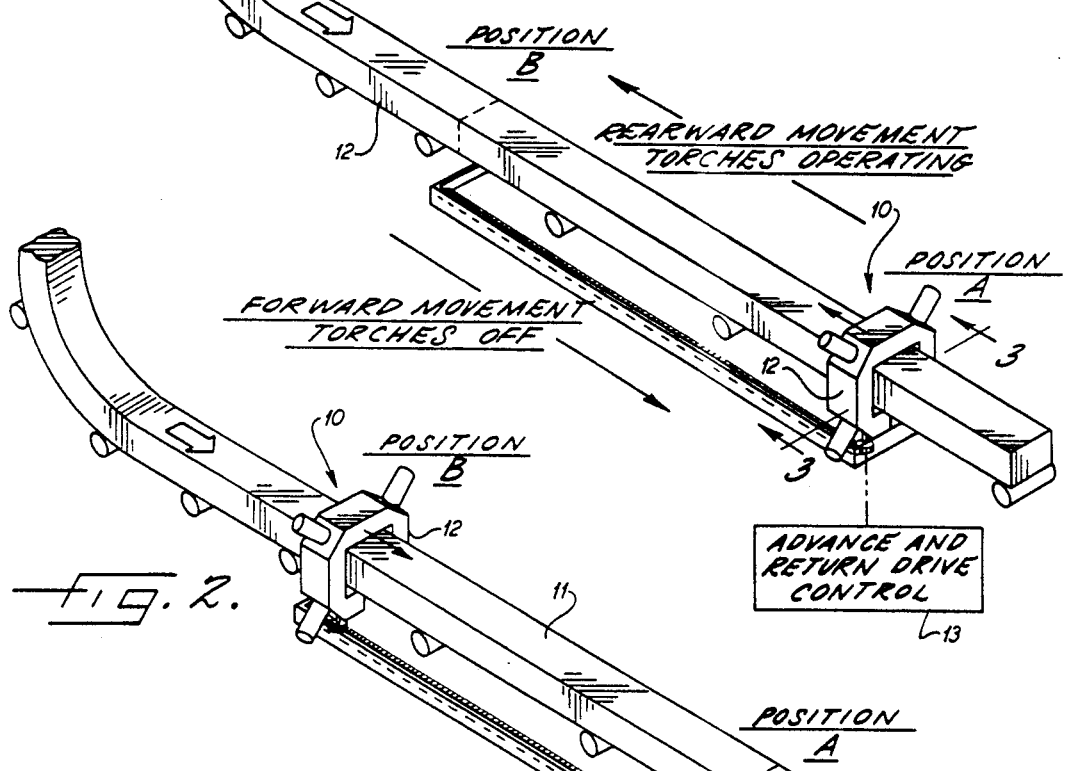
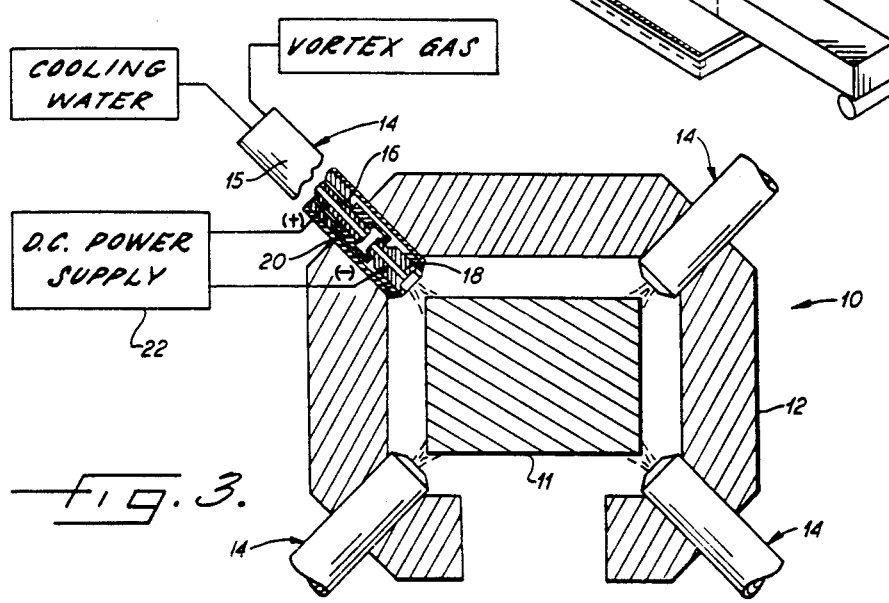

METHOD AND APPARATUS FOR ENHANCING THE QUALITY OF CAST BILLETS

BACKGROUND OF THE INVENTION

The present invention relates to a method and apparatus for enhancing the quality of continuously cast steel billets, and which may be employed in association with the conventional continuous casting operation.

During the vertical continuous casting of steel billets, the billet advances from the caster in a downward direction and then gradually curves to a horizontal direction as it cools. When casting products of round cross section, the solidification process is relatively uniform and the cast metal experiences isotropic stresses that are easily relieved during the subsequent cooling process. However, when casting square or rectangular billets, certain anisotropic stresses occur in the cast metal during solidification and cooling, and these stresses may be significant and can cause the sharp corner edges of the cast metal to crack during the initial rapid cooling process. These cracks resemble V-like stripes on the edges, and they are commonly called chevron cracks. Such chevron cracks typically are 1/16 to ¼ inch deep. While the development of chevron cracks is more prevalent in the case of vertical continuous casting, it is often a problem in a horizontal continuous casting operation.

The quality of the cast steel billet is determined in part by the number, density, and average depth of the chevron cracks, and these characteristics of the cracks are affected by the content of carbon and alloying elements in the steel. Billets with high carbon content exhibit more and deeper cracks, while high alloy steels exhibit fewer and more shallow cracks, or perhaps no cracks at all.

Quality control inspection of continuously cast steel billets is a difficult procedure, and the inspection cannot now be easily accomplished visually while the billet is hot. In addition, there are four or more corner edges to visually inspect while the billet is advancing, and as a result, visual inspection is now accomplished only after the billets are cooled and they can be scrutinized and handled for further processing as may be required to remove the cracks.

The U.S. Pat. No. 3,596,047 to Maniero discloses a prior procedure for removing cracks from the surface of a metal workpiece, and wherein one or more electric arcs engage the surface of the workpiece. The arcs cause the surface to melt and heal the cracks. This procedure however is not seen to be able to closely control the applied level of heat, and in addition, the workpiece must be electrically grounded which increases the complexity of the apparatus.

It is accordingly an object of the present invention to provide a method and apparatus for efficiently enhancing the quality of continuously cast steel billets, and which effectively removes and heals the cracks which may be present along the corner edges of the billet.

It is also an object of the present invention to provide a method and apparatus of the described type, which is able to closely control the amount of heat applied to the corner edges of the workpiece, and which does not require that the workpiece be electrically grounded. It is still another object of the present invention to provide a method and apparatus of the described type which may be employed in conjunction with the continuous casting operation, and so that the billet may be hot during the quality enhancing operation to thereby minimize the heat energy required.

SUMMARY OF THE INVENTION

These and other objects and advantages of the present invention are achieved in the embodiments illustrated herein by the provision of a method and apparatus which includes a framework which is mounted for selective movement in rearward and forward directions along the path of travel of the billet as it advances in a hot condition from the caster. The framework mounts at least one plasma arc torch thereon, with the torch oriented so as to be directed toward one of the corner edges of the advancing billet. In operation, the framework is advanced rearwardly along the path of travel from an initial position to a rearward position, with the plasma arc torch being operated so that the heated plasma directly engages the adjacent corner edge of the advancing metal billet. In addition, the speed of the rearwardly advancing framework is coordinated with the forward speed of the billet so that the heated plasma heats the corner edge to a temperature sufficiently hot to melt and fuse together any cracks adjacent such corner edge. The framework is then returned forwardly along the path of travel from the rearward position to the initial position, with the plasma torch being nonoperative. The return of the framework is at a speed which is at least equal to the advancing speed of the billet, and upon reaching the initial position, the framework is in position to repeat the rearward advance and return so that all longitudinal portions of the continuously advancing hot billet are treated.

In the preferred embodiment, the plasma arc torch comprises rear and front electrodes, and the torch is operated in a non-transfer arc mode wherein the electric arc extends between the front and rear electrodes and does not contact the advancing billet. Thus the grounding of the billet is not required. Also, where the billet is of rectangular cross section, the framework preferably mounts four like plasma arc torches, with each torch being arranged to heat a respective one of the corner edges.

BRIEF DESCRIPTION OF THE DRAWINGS

Some of the objects and advantages of the present invention having been stated, others will appear as the description proceeds, when considered in conjunction with the accompanying drawings, in which FIG. 1 is a schematic illustration of an apparatus embodying the features of the present invention and positioned along the path of travel of an advancing hot billet;

FIG. 2 is a view similar to FIG. 1 and illustrating the apparatus at the rearward position; and FIG. 3 is an enlarged cross sectional view of the apparatus taken substantially along the line 3—3 of FIG. 1.

DETAILED DESCRIPTION OF THE PREFERRED EMBODIMENT

Referring more particularly to the drawings, an apparatus embodying the features of the present invention is illustrated schematically at 10. The apparatus 10 is positioned along the path of travel of a steel billet 11 as it emerges from a vertical continuous casting operation, and thus while the billet is at a relatively high temperature.

The apparatus 10 comprises a framework 12 which is mounted for selective movement in rearward and forward directions along the path of travel of the billet, and between an initial position (Position A as shown in FIG. 1) and a rearward position (Position B as shown in FIG. 2). The advance and return of the framework 12 is effected by a suitable drive control which is indicated schematically at 13. The framework 12 mounts a total of four like plasma arc torches 14, with the torches being positioned in a generally rectangular arrangement as best seen in FIG. 3. In the illustrated embodiment, the four torches are mounted in a common transverse plane. If desired however, the torches may be mounted in longitudinally offset planes so as to minimize heating of the framework 12.

Each of the plasma arc torches comprises a torch housing 15, with a rear electrode 16 mounted within the housing. The rear electrode 16 comprises a tubular metal member having a closed inner end and an open outer end. Also, a front electrode 18 is mounted within the housing and in coaxial alignment with and adjacent the open outer end of the rear electrode, and the front electrode 18 comprises a tubular metal member having a bore therethrough. Gas vortex generating means 20 is also mounted within the housing for generating a vortical flow of a gas at a location intermediate the rear and front electrodes, and a power supply 22 is provided which is connected to the rear and front electrodes for generating an electrical arc which is adapted to extend axially from the bore of the rear electrode through the vortical flow of gas and to an attachment located on the bore of the front electrode. The power supply 22 for each torch includes a direct current power source, with the anode thereof preferably connected to the rear electrode and the cathode connected to the front electrode. A torch of the described construction is per se known in the art, and a more detailed description may be obtained from U.S. Pat. Nos. 4,549,065 and 4,587,397 to Camacho et al, the disclosures of which are expressly incorporated herein by reference.

From the above description, it will be seen that each torch 14 is adapted to operate in the non-transfer arc mode, wherein the arc extends between the rear and front electrodes and does not contact the advancing billet 11. Further, each torch is positioned so that the gas from the gas vortex generating means passes forwardly through the front electrode and is heated by the arc so as to form a heated plasma. The heated plasma then engages the associated corner edge of the billet 11.

In operation, the framework 12 is initially at the initial position A and is advanced rearwardly along the path of travel to the rearward position B. During this rearward advance, each of the plasma arc torches 14 is operated so that the heated plasma directly engages one of the corner edges of the advancing metal billet 11. Also, the speed of the rearward advance provided by the drive control 13 is coordinated with the forward speed of the billet 11 so that the heated plasma heats each corner edge to a temperature sufficiently hot to melt and fuse together any cracks which are adjacent the corner edges. During this process, any surface oxides which have formed in the cracks are typically floated to the surface and removed.

Upon reaching the rearward position B, the operation of the plasma torches 14 is terminated, and the framework 12 is then advanced forwardly along the path of travel to the initial position by the drive control 13. The return speed may be the same as or slightly greater than the advancing speed of the billet. Upon reaching the initial position A, the rearward advance is again commenced immediately upon a non-treated portion of the billet reaching the initial position A. By repeating these steps, all longitudinal portions of a continuously advancing hot billet are treated.

In the drawings and specification there has been set forth the best mode presently contemplated for the practice of the present invention, and although specific terms are employed, they are used in a generic and descriptive sense only and not for purposes of limitation.

That which is claimed is:

1. A method of enhancing the quality of a continuously cast metal billet having a plurality of corner edges along the length of the billet and while the billet continuously advances forwardly along a path of travel from a casting station, and comprising the steps of providing a framework which is mounted for selective movement in rearward and forward directions along said path of travel, and with said framework mounting at least one plasma arc torch thereon, advancing the framework rearwardly along the path of travel from an initial position to a rearward position and while operating said plasma arc torch so that the heated plasma directly engages one of the corner edges of the advancing metal billet, and while coordinating the speed of the rearwardly advancing framework with the forward speed of the advancing billet so that the heated plasma heats such corner edge to a temperature sufficiently hot to melt and fuse together any cracks adjacent such corner edge, and then returning the framework forwardly along the path of travel from said rearward position to said initial position while the plasma torch is non-operative, and with the return being at a speed at least equal to the advancing speed of the billet, and repeating the above recited advancing and returning steps so that all longitudinal portions of the advancing billet are treated.

2. The method as defined in claim 1 wherein said plasma arc torch includes rear and front electrodes, and the step of operating the torch includes operating the torch in a non-transfer arc mode wherein an electrical arc extends between said front and rear electrodes and does not contact the advancing billet.

3. The method as defined in claim 2 wherein said plasma arc torch further includes gas vortex generating means positioned between said rear and front electrodes, and wherein the gas of the gas vortex generating means exits through the front electrode and contacts the advancing billet.

4. The method as defined in claim 3 wherein said advancing billet is of rectangular cross section and has four corner edges, and wherein said framework mounts four like plasma arc torches, with each of said torches being arranged to heat a respective one of said corner edges during said advancing step.

5. A method of enhancing the quality of a metal billet having a plurality of corner edges along the length thereof, and comprising the steps of advancing the billet along a path of travel in a forward direction, providing a framework which mounts at least one plasma arc torch thereon, with said one plasma torch including rear and front electrodes, and gas vortex generating means positioned between said rear and front electrodes, cyclically advancing said framework in a rearward direction and a forward direction along the path of travel, and while operating said one torch during at least a portion of the cyclical advance of said framework so as to generate an electric arc with the gas vortex surrounding said arc and forming a heated plasma which exits through the forward electrode and directly engages one of the corner edges of the metal billet, and while coordinating the relative speed of the framework and the billet so that the heated plasma heats such corner edge to a temperature sufficient to melt and fuse together any cracks adjacent such corner edge.

6. The method as defined in claim 5 wherein the step of operating said one torch includes operating said one torch during the rearward movement of the torch and terminating operation of said one torch during the forward movement of the framework.

7. The method as defined in claim 5 wherein the stop of operating said one torch includes operating said one torch in a non-transfer arc mode wherein the electric arc extends from said rear electrode to said forward electrode.

8. The method as defined in claim 5 wherein said billet is a continuously cast metal billet, and wherein the step of cyclically advancing said framework along the path of travel is conducted immediately after the casting of the billet and such that the billet is at an elevated temperature.

* * * * *